United States Patent
Mahata et al.

(10) Patent No.: US 9,986,407 B2
(45) Date of Patent: May 29, 2018

(54) METHOD AND SYSTEM FOR DETERMINING PERFORMANCE OF AN APPLICATION INSTALLED ON MOBILE STATIONS

(71) Applicant: Wipro Limited, Bangalore (IN)

(72) Inventors: Debashis Mahata, Dist-Burdwan (IN); Mudit Mathur, Chennai (IN); Aditya Pratyay, Siwan (IN)

(73) Assignee: WIPRO LIMITED, Bangalore (IN)

( * ) Notice: Subject to any disclaimer, the term of this patent is extended or adjusted under 35 U.S.C. 154(b) by 0 days. days.

(21) Appl. No.: 15/374,122

(22) Filed: Dec. 9, 2016

(65) Prior Publication Data

US 2018/0124545 A1  May 3, 2018

(30) Foreign Application Priority Data

Oct. 28, 2016 (IN) .............................. 201641037167

(51) Int. Cl.
*H04W 4/50* (2018.01)
*H04W 4/00* (2018.01)
(Continued)

(52) U.S. Cl.
CPC ............. *H04W 4/50* (2018.02); *H04M 15/58* (2013.01); *H04M 15/61* (2013.01); *H04W 4/001* (2013.01); *H04W 24/08* (2013.01)

(58) Field of Classification Search
CPC .. G06F 3/0482; G06F 3/04842; H04W 24/08; H04W 4/00
(Continued)

(56) References Cited

U.S. PATENT DOCUMENTS 9,734,037 B1 * 8/2017 McCorkendale ... G06F 11/3466
2012/0317266 A1 12/2012 Abbott
(Continued)

FOREIGN PATENT DOCUMENTS

EP    2 733 614    5/2014

OTHER PUBLICATIONS

Extended European Search Report issued in European Patent Office in counterpart European Application No. 17159259.5, dated Sep. 6, 2017, 10 pages.

*Primary Examiner* — Sam Bhattacharya
(74) *Attorney, Agent, or Firm* — Finnegan, Henderson, Farabow, Garrett & Dunner, LLP

(57) ABSTRACT

The present disclosure is related in general to performance assessment and a method and a system for determining performance of an application installed on mobile stations. An application performance detection system configures each of the mobile stations upon receiving a performance assessment request to ensure deactivation of hardware and software modules that cause additional network traffic and resource utilization. Further, the application performance detection system receives application data from the mobile stations thus configured and determine Key Performance Indices (KPIs) based on the application data. Rating of the application is determined based on the KPIs that can efficiently detect low rated application design that requires re-engineering. Finally, performance of the application is verified that helps in achieving significant reduction in operational data costs, improved device battery life, improved user experience and efficient network resource usage. Further, the present disclosure suggests an optimized application to users based on their geographic location.

17 Claims, 4 Drawing Sheets

(51) Int. Cl.
*H04M 15/00* (2006.01)
*H04W 24/08* (2009.01)

(58) Field of Classification Search
USPC .............................. 455/405, 418, 423, 525
See application file for complete search history.

(56) References Cited

U.S. PATENT DOCUMENTS

| | | | |
|---|---|---|---|
| 2014/0141768 A1* | 5/2014 | Javaid | H04W 4/001 |
| | | | 455/423 |
| 2015/0133076 A1 | 5/2015 | Brough | |
| 2015/0212563 A1 | 7/2015 | Gerber et al. | |
| 2016/0043983 A1* | 2/2016 | Bishop | H04L 51/16 |
| | | | 709/206 |
| 2016/0098334 A1* | 4/2016 | Hariharakrishnan | ........ |
| | | | G06F 11/3013 |
| | | | 702/186 |

* cited by examiner

METHOD AND SYSTEM FOR DETERMINING PERFORMANCE OF AN APPLICATION INSTALLED ON MOBILE STATIONS

TECHNICAL FIELD

The present subject matter is related in general to data analytics, and more particularly, but not exclusively to a method and a system for determining performance of an application installed on one or more mobile stations,

BACKGROUND

Generally, business to customer (B2C) applications are very popular and used heavily in most telecom operator's network. One of the important aspects of B2C applications is user interaction. For any B2C applications to be successful, efficient user experience is crucial.

Unfortunately, statistics indicate that user experience of B2C applications is not satisfactory i.e. the user experience is poor due to the issues faced by the users such as slow application responsiveness, heating up of device in which the application is installed or battery draining out rapidly due to use of the application. Due to these issues, the B2C applications waste critical network resources that further cause in-ability to access voice/data services for other users. This ultimately leads to a significant loss in revenue for the business. There are high chances that engineering problem in designing the application impacts telecom operators though they are not the origin for the problem.

In the existing techniques, operators analyze the application performance by installing probes into the network and process the probed data offline. However, processing the probed data offline is a time consuming as well as a non-economical process. Further, the existing techniques analyze the issues from operator point of view but not from the user point of view.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure provides a method for determining performance of an application installed on one or more mobile stations. The method comprises configuring, by an application performance detection system, each of the one or snore mobile stations upon receiving a performance assessment request from an assessment scheduler device associated with the application performance detection system. Upon configuring each of the one or more mobile stations, the application performance detection system receives application data pertaining to the application from each of the one or more mobile stations thus configured. The application data comprises one or more device parameters and network traffic parameters. Further, the application performance detection system determines one or more absolute Key Performance Indices (KPIs) by correlating the application data of the application obtained from each of the one or more mobile stations separately. The one or more KPIs comprise fair usage index, information availability index, network load index and device resource consumption index. Furthermore, the application performance detection system determines absolute rating of the application by correlating the one or more absolute KPIs of the application obtained from each of the one or more mobile stations separately. Finally, the application performance detection system verifies the performance of the application based on the absolute rating of the application.

Further, the present disclosure comprises determining performance of an application installed on one or more mobile stations. The application performance detection system comprising a processor and a memory communicatively coupled to the processor. The memory stores the processor-executable instructions, which, on execution, causes the processor to configure each of the one or more mobile stations upon receiving a performance assessment request from an assessment scheduler device associated with the application performance detection system. Upon configuring the one or more mobile stations., the processor receives application data pertaining to the application from each of the one or more mobile stations thus configured, wherein the application data comprises one or more device parameters and network traffic parameters. Further, the processor determines one or more absolute Key Performance Indices (KPIs) by correlating the application data of the application obtained from each of the one or more mobile stations separately. The one or more KPIs comprise fair usage index, information availability index, network, load index and device resource consumption index. Furthermore, the processor determines absolute rating of the application by correlating the one or more absolute KPIs of the application obtained from each of the one or more mobile stations separately. Finally, the processor verifies the performance of the application based on the absolute rating of the application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
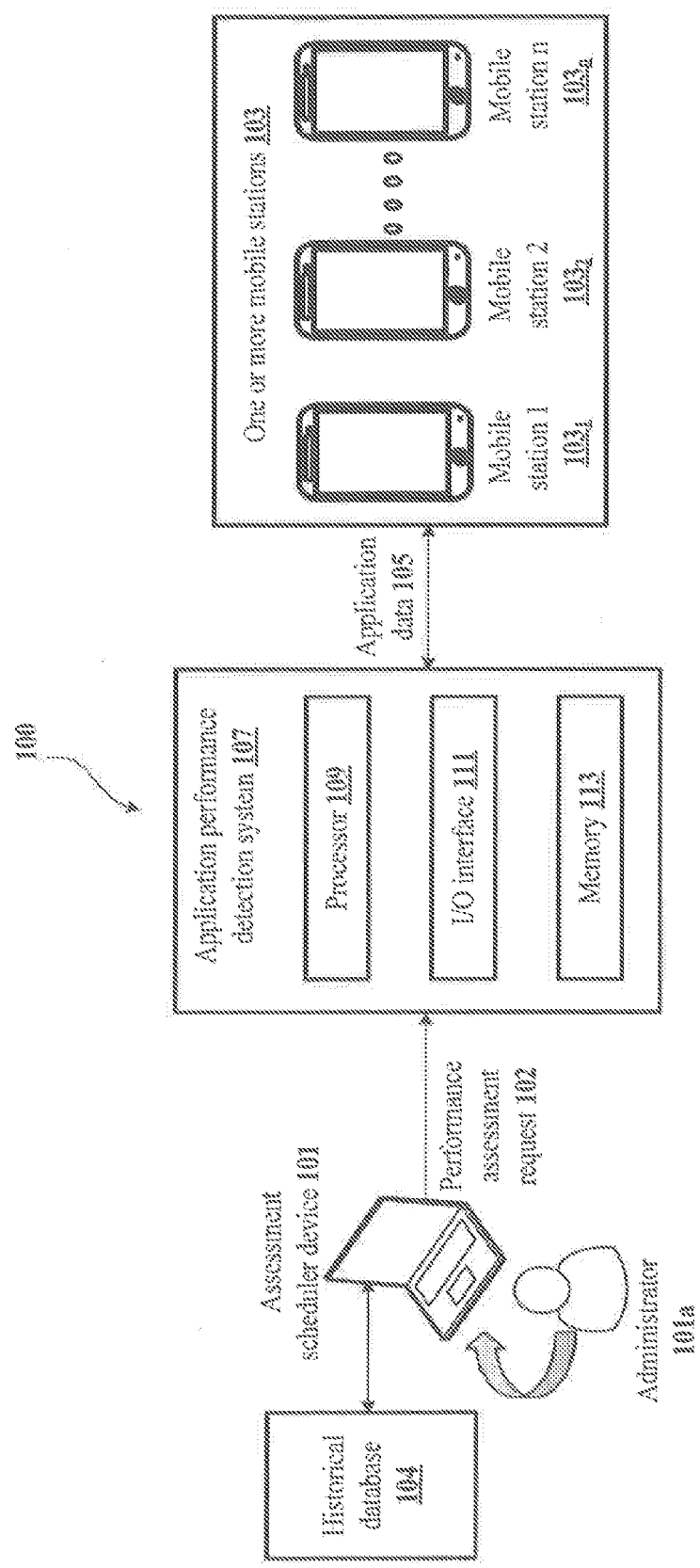
FIG. 1 shows an exemplary architecture for determining performance of an application installed on one or more mobile stations in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides a method and a system for determining performance of an application, installed on one or more mobile stations. The method comprises configuring, by an application performance detection system, each of the one or more mobile stations upon receiving a performance assessment request from an assessment scheduler device associated with the application performance detection system. Each of the one or more mobile stations are configured such that any hardware and software modules that do not contribute to the performance assessment of the application are deactivated to ensure that no additional network traffic and resource utilization is initiated. Upon configuring each of the one or more mobile stations, the application performance detection system receives application data pertaining to the application from each of the one or more mobile stations thus configured. The application data comprises one or more device parameters and network traffic parameters. The application data is collected during execution of a use case in each of the one or more mobile stations.

Further, the application performance detection system determines one or more Key Performance Indices (KPIs) by correlating the application data obtained from each of the one or more mobile stations separately. The one or more KPIs comprise fair usage index, information availability index, network load index and device resource consumption index. The one or more KPIs may be absolute KPIs which are specific to the mobile station or relative KPIs which are determined by comparing with one or more other similar applications in all mobile stations. An absolute rating derived from the one or more absolute KPIs is used to verify performance of the application with respect to the particular, mobile station in which the application is installed. Further, an average rating is derived by correlating the absolute rating of the application for each of the one or more mobile stations. A relative rating derived from the one or more relative KPIs is determined for the application across each of the one or more mobile stations. The relative rating of the application in an operator network detects low rated application design that requires re-engineering. Finally, the application performance detection system verifies the performance of the application and relative performance of the application with respect to one or more other similar applications. Based on the performance and relative performance of the application, the present disclosure achieves significant reduction in operational data costs, improved device battery life, improved user experience and efficient network resource usage. Further, the present disclosure suggests an optimized application to one or more users based on their geographic location.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for determining performance of an application installed on one or more mobile stations in accordance with some embodiments of the present disclosure.

The architecture 100 comprises an assessment scheduler device 101, one or more mobile stations, mobile station 1 $103_1$ to mobile station n $103_n$ (collectively referred to as one or more mobile stations 103), a communication network (not shown in the FIG.) and an application performance detection system 107. The assessment scheduler device 101 is associated with the application performance detection system 107 through the communication network. In an embodiment, the communication network may be at least one of wired communication network and wireless communication network. Further, the assessment scheduler device 101 may be either locally or remotely associated with the application performance, detection system 107. As an example, the one or more mobile stations 103 may include, but not limited to, a mobile and a tablet. Each of the one or more mobile stations 103 may comprise at least one of an application or one or more other similar applications installed in them.

An administrator $101_a$ associated with the assessment scheduler device 101 selects applications from a specific industry segment for a specific operator circle and a particular geographic location to assess the applications. In an embodiment, when the administrator 101a selects the particular geographic location, the administrator 101a ensures that each of the one or more mobile stations 103 is physically located at that particular geographic location. The administrator 101a uses assessment scheduler device 101 to identify, from a historical database 104 associated with the assessment scheduler device 101, $N_A$ number of most popular applications, $N_D$ number of most popular unique mobile stations where applications are being used, $N_T$ number of execution times in a day that matches different network load conditions. Further historical database 104 may include, but not limited to, information related to users of an operator network and types of mobile stations used by the users of the operator network, which are collected from backend server of the operator network. The assessment scheduler device 101 ensures that all combinations from {NA}×{ND}×{NT} are covered by appropriately forming performance assessment request 102 and by physically locating {NA}×{ND} number of devices in an appropriate geographic location. Further, each of the one or more mobile stations 103 will execute {NA}×{NT} number of tests.

The application performance detection system 107 comprises a processor 109, an I/O interface 111 and a memory 113. The I/O interface 111 receives the performance assessment request 102 from the assessment scheduler device 101. Upon receiving the performance assessment request 102, the processor 109 configures each of the one or more mobile stations 103. Further, the processor 109 triggers a monitoring module in each of the one or more mobile stations 103 to monitor and collect application data 105. Upon monitoring and collecting, each of the one or more mobile stations 103 transmit the application data 105 to the application performance detection system 107 which is received through the I/O interface 111. The application data 105 thus received is stored in the memory 113. The processor 109 correlates the application data 105 obtained from each of the one or more mobile stations 103 separately to determine one or more Key Performance Indices (KPIs). As an example, the one or more KPIs may include, bat not limited to, fair usage index, information availability index, network load index and device resource consumption index. Further, the one or more KPIs are correlated as described in the description below to obtain absolute rating of the application, average rating of the application and relative rating of the application with respect to one or more other similar applications. Based on the rating, performance of the application is assessed and based on the performance one or more suggestions are indicated to improve the performance of the application.

Figure 2:
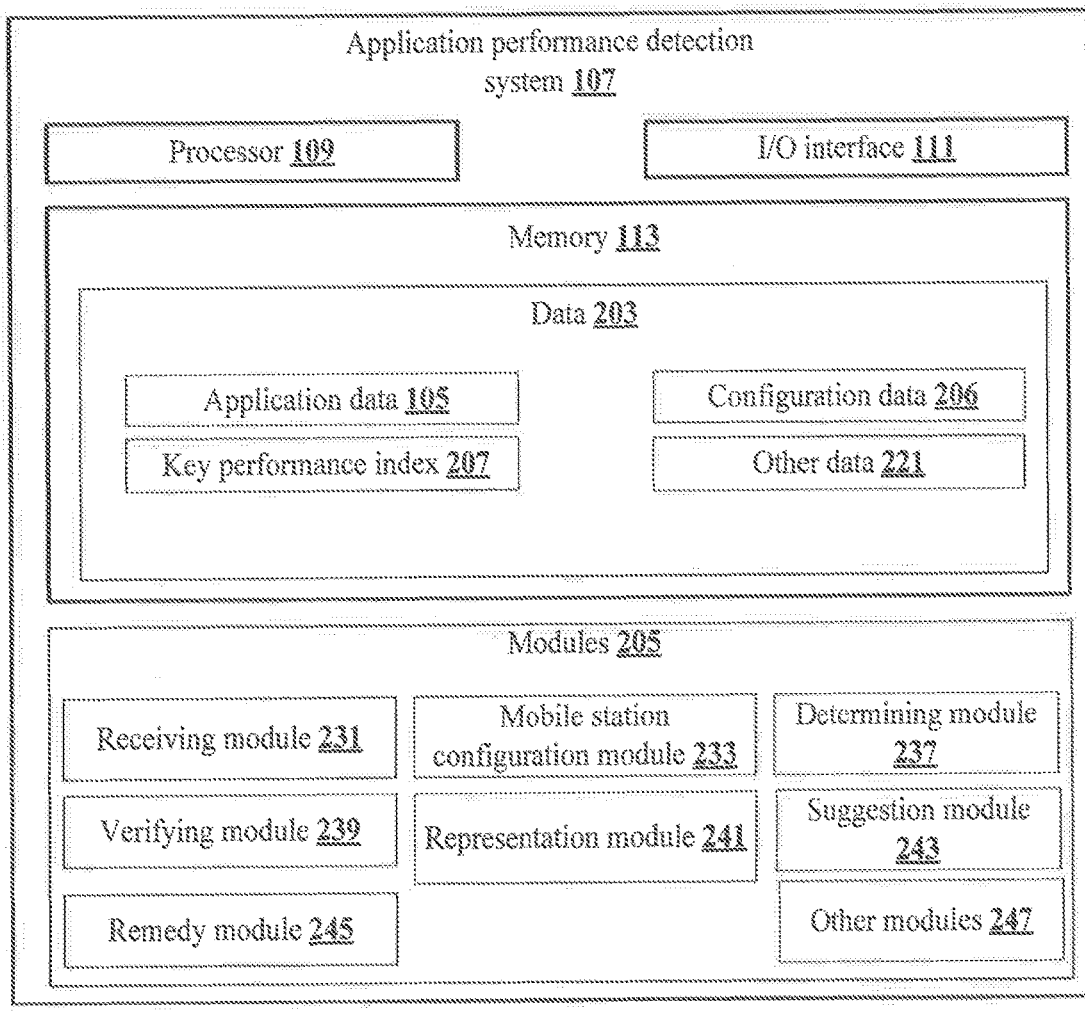
FIG. 2 shows a detailed block diagram of an application performance detection system for of determining performance of an application installed on one or more mobile stations in accordance with some embodiments of the present disclosure.

FIG. 2 shows a detailed block diagram of an application performance detection system for determining performance of an application installed on one or more mobile stations in accordance with some embodiments of the present disclosure.

In one implementation, the application performance detection system 107 receives the application data 105 from the one or more mobile stations 103 associated with the application performance detection system 107. As an example, the application data 105 retrieved are stored in the memory 113 configured in the application performance detection system 107 as shown in the FIG. 2. In one embodiment, data 203 includes the application data 105, configuration data 206, key performance index data 207 and other data 221. In the illustrated FIG. 2, modules 205 are described herein in detail.

In one embodiment, the data may be stored in the memory 113 in the form of various data structures. Additionally, the aforementioned data can be organized using data models, such as relational or hierarchical data models. The other data 221 may store data, including temporary data and temporary files, generated by modules 205 for performing the various functions of the application performance detection system 107.

In an embodiment, the application data 105 from each of the one or more mobile stations 103 mainly comprises one or more device parameters and network parameters. The application data 105 may include, but not limited to, cell Identification (ID), current consumption samples of the mobile station with a sampling frequency of one second, signal strength samples with sampling frequency of one second, total upload data volume, total download data volume, total Transmission Control Protocol (TCP) sessions, concurrent TCP sessions, total User Datagram Protocol (UDP) sessions, total Internet Protocol version 4 (IPv4) sessions, data map for each open socket, Round Trip Time (RTT) map for each open socket, Time To First received Packet (TTFP) map for each open socket, traceroute hop list for each server destination, streaming resolution map, bitrate map, streaming codec and radio state distribution for time period of a use case execution.

In an embodiment, the configuration data 206 comprises one or more scripts to configure each of the one or more mobile stations 103. As an example, the one or more scripts may include, but not limited to, configuration scripts and execution scripts.

In an embodiment, the key performance index data 207 comprises one or more Key Performance Indices (KPIs). As an example, the one or more KPIs may include, but not limited to, fair usage index, information availability index, network load index and device resource consumption index.

The fair usage index is a measure of volume of business data consumed by the application. One or more factors affecting the KPI "Fair usage index" are upload data volume i.e. amount of data transmitted from each of the one or more mobile stations 103 during the execution of the use case and download data volume i.e. amount of data received by each of the one or more mobile stations 103 during the execution of the use case. The use case may be at least one of a download dominated use case or an upload dominated use ease. In an embodiment, download dominated use case is mainly for the purpose of downloading data on each of the one or more mobile stations 103 such as viewing updates on social networking applications, searching for a product on an online shopping application etc. The download dominated use case does not observe high volume of data upload by the application. Alternatively, the upload dominated use case is mainly for the purpose of uploading data from each of the one or more mobile stations 103 such as uploading an image, a video, text etc. The upload dominated use case does not observe high volume of data download by the application.

The information availability index is a measure of how fast the data is made available to/from the network. One or more factors affecting the KPI "Information availability index" are as shown in the below Table 1.

TABLE 1

| Factors affecting KPI "Information availability index" | Description |
| --- | --- |
| Volume of data flow across each socket | The application may use multiple sockets to execute the use case, which involves traversal of different volumes of data through each of the multiple sockets used by the application depending on design of the application. The volume of the data traversed through each of the multiple sockets is important in understanding how critical each of the multiple sockets is in terms of user experience during the use case execution. |
| RTT and TTFP for each socket | Amount of time elapsed between opening a socket and receiving first data packet at that socket. |

The network load index is a measure of amount of network load generated by the execution of the use ease.

One or more factors affecting the KPI "network load index" are as shown in the below Table 2.

TABLE 2

| Factors affecting KPI "Network load index" | Description |
| --- | --- |
| Total number of sockets | Number of sockets used by the application for data exchange during the execution of the use case. |
| Use case execution time | Total time taken to execute the use case |
| Data idle time | Measure of amount of time for which no data was either transmitted or received by each of the one or more mobile stations 103. |
| Radio Resource Control (RRC) usage index | RRC usage index is the Radio state distribution among various power modes i.e. High power, Medium power and Low power |

The device resource consumption index is a measure of device current consumption and device data consumption during the use case execution. In a non-limiting embodiment, each of the one or more mobile stations 103 is considered as the device in the present disclosure. The one or more KPIs may be at least one of absolute KPIs and relative KPIs. In an embodiment, the absolute KPIs are the KPIs determined for a particular application with respect to a particular mobile station, in another embodiment, the relative KPIs are the KPIs determined for a particular application with one or more other similar applications across one or more mobile stations 103.

In an embodiment, the data stored in the memory 113 is processed by the modules 205 of the application performance detection system 107. The modules 205 may be stored within the memory 113. In an example, the modules 205 communicatively coupled to a processor 109 configured in the application performance detection system 107, may also be present outside the memory 113 as shown in FIG. 2 and implemented as hardware. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a receiving module 231, a mobile station configuration module 233, a determining module 237, a verifying module 239, a representation module 241, a suggestion module 243, a remedy module 245 and other modules 247.

The other modules 247 may be used to perform various miscellaneous functionalities of the application performance detection system 107. It will be appreciated that such aforementioned modules 205 may be represented as a single module or a combination of different modules.

In an embodiment, the receiving module 231 receives a performance assessment request 102 from an assessment scheduler device 101 associated with the application performance detection system 107. The assessment scheduler device 101 may be either locally or remotely associated with the application performance detection system 107. The performance assessment request 102 is a request to assess an application and the one or more other similar applications of a specific industry segment.

In an embodiment, the mobile station configuration module 233 configures each of the one or more mobile stations 103. The mobile station configuration module 233 configures each of the one or more mobile stations 103 by executing the one or more scripts. As art example, the one or more scripts may include, but not limited to, configuration scripts and execution scripts. Upon executing the one or more scripts, the mobile station configuration module 233 deactivates hardware and software modules present in each of the one or more mobile stations 103 that do not contribute for the application data 105. As an example, the hardware and software modules to be deactivated may include, bat not limited to, Wi-Fi, Bluetooth, Near Field Communication (NFC), Global Positioning System (GPS), Google account, Automatic synchronization and display brightness. The mobile station configuration module 233 deactivates the hardware and software modules to ensure that the hardware and software modules do not cause additional network traffic and resource utilization. The mobile station configuration module 233 further ensures that no traffic flows through the one or more mobile stations 103 when the use case is being executed by closing ail open sockets and waiting for already open sockets to get closed. Furthermore, the mobile station configuration module 233 activates a monitoring module in each of the one or more mobile stations 103 to monitor and collect the application data 105. The application data 105 to be monitored and collected depends on the use case being executed in each of the one or more mobile stations 103. In an embodiment, the use case execution is triggered by the application performance detection system 107. In an embodiment, the monitoring module in each of the one or more mobile stations 103 monitors and collects the application data 105 as shown in the below Table 3.

TABLE 3

| Application data | Method to monitor and collect |
| --- | --- |
| Total upload data volume | Method 1:<br>1. Retrieve amount of data transmitted by the mobile station at beginning of use case execution and at end of the use case execution from the mobile station's file structure. As an example, consider a mobile station comprising Android as the operating system. The file related to data transmitted may be located at path"/sys/class/net/RADIO-INF/statistics/tx_bytes", where RADIO-INF is the name of radio interface assigned by the operating system.<br>2. Determine total upload data volume by calculating difference in the amount of data transmitted at the beginning of the use case execution and at the end of the use case execution.<br>Method 2:<br>Method 2 is for the mobile stations whose operating system does not expose file related to data transmitted.<br>1. Monitor and record packet sizes transmitted through RADIO-INF interface during the time period of use case execution. |

TABLE 3-continued

| Application data | Method to monitor and collect |
|---|---|
| | 2. Determine total upload data volume by adding the packet sizes. |
| Total download data volume | Method 1:<br>1. Retrieve amount of data received by the mobile station at beginning of use case execution and at end of the use case execution from the mobile station's file structure. As an example, consider a mobile station comprising Android as the operating system. The file related to data received may be located at path "/sys/class/net/RADIO-INF /statistics/rx_bytes", where RADIO-INF is the name of radio interface assigned by the operating system.<br>2. Determine total download data volume by calculating difference in the amount of data received at the beginning of the use case execution and at the end of the use case execution.<br>Method 2:<br>Method 2 is for the mobile stations whose operating system does not expose file related to data received.<br>    1. Monitor and record packet sizes received through RADIO-INF interface during the time period of use case execution.<br>    2. Determine total download data volume by adding the packet sizes. |
| Total TCP sessions | Total TCP session is the measure of number of open TCP sockets that are used by the mobile station during use case execution. As an example, consider a mobile station comprising Android as the operating system. The operating system comprises a socket information file (SOCK-STAT-DIAG-FILE) that provides information related to number of open TCP sockets at any given point of time.<br>1. Poll the socket information file and record initial number of open TCP sockets at beginning of use case execution.<br>2. If any increase is observed in number of open TCP sockets during successive polls, then sum up the difference till end of the use case execution to compute total TCP sessions used during the use case execution. |
| Concurrent TCP session | Concurrent TCP session is the measure of number of open TCP sockets that are open simultaneously during the use case execution. This is computed by taking average of TCP socket count samples. |
| Total UDP sessions | Total UDP session is the measure of number of open UDP sockets that are used by the mobile station during use case execution. As an example, consider a mobile station comprising Android as the operating system. The operating system comprises a socket information file (SOCK-STAT-DIAG-FILE) that provides information related to number of open UDP sockets at any given point of time.<br>1. Poll the socket information file and record initial number of open UDP sockets at beginning of use case execution.<br>2. If any increase is observed in number of open UDP sockets during successive polls, then sum up the difference till end of the use case execution to compute total UDP sessions used during the use case execution. |
| Total IPv4 sessions | IPv4 session is number of TCPv4 and UDPv4 sockets used during the use case execution. Method to compute IPv4 session is same as the method used to determine total TCP sessions and total UDP sessions but only TCPv4 and UDPv4 open socket counts are monitored instead of monitoring all the TCP open sockets and UDP open sockets. |
| Data map for each open socket | Each socket is identified by a unique identifier {Source IP, Source Port, Destination IP, Destination Port}.<br>1. Extract and maintain information set comprising {Socket identifier, Time stamp, Source IP, Destination IP, Packet Size} when a new data packet is observed.<br>2. Maintain two sample lists for each socket, one sample list for data transmitted (TX-LIST) and one sample list for data received (RX-LIST). |
| RTT map for each open socket | RTT is the measure of time taken to open a socket. RTT is calculated only for TCP sockets. When a TCP socket is created by the application, exchange of TCP SYN (SYNchronize) packet and SYN-ACK (SYNchronize ACKnowledgement) packet exchange occurs. Determine time difference between exchange of SYN-ACK packet and SYN packet is measured as RTT of the TCP socket. |
| TTFP map for each open socket | TTFP is the measure of time taken to receive first data packet at an opened socket. Monitor the incoming data packets and record the time taken using timestamp mentioned on the received data packet. |

TABLE 3-continued

| Application data | Method to monitor and collect |
|---|---|
| Traceroute hop list for each server destination | 1. Extract traceroute hop details and delay in each hop for each IP address that the application tried to access based on full list of IP addresses available after use case execution.<br>2. Compute Traceroute hop details using PING based mechanism and by sending out UDP data packets. |
| Cell ID | Capture network cell ID where the mobile station is executing the use case. |
| Current consumption samples of the mobile station | 1. Record samples of mobile station current consumption with a sampling frequency of one second. |
| Signal strength samples | 1. Record samples of signal strength with a sampling frequency of one second. |
| Radio state distribution | Retrieve information on radio state distribution for the time period of use case execution via APIs provided by the operating system or third party library. |
| Streaming resolution map | 1. Monitor video stream for resolution change. Monitoring is performed by analysing incoming data packets received through radio interface.<br>2. Maintain change in media stream resolution over time in a list call resolution map. |
| Bitrate map | 1. Monitor video stream for bitrate change, which occurs during change in network bandwidth. Monitoring is performed by analysing incoming data packets received through radio interface.<br>2. Maintain change in bitrate information over time is a bitrate map. |
| Streaming codec | Parse the data packets received at radio interface to observe encoding format used in a media stream. |

In or embodiment, the receiving module 231 further receives the application data 105 pertaining to the application from each of the one or more mobile stations 103 that are configured by the mobile station configuration module 233.

In an embodiment, the determining module 237 determines the one or more Key Performance Indices (KPIs) by correlating the application data 105 received from each of the one or more mobile stations 103 separately. As an example, the one or more KPIs may include, but not limited to, the fair usage index, the information availability index, the network load index and the device resource consumption index.

The KPI "Fair usage index" for the upload dominated use case is determined using the below Equation 1.

Fair usage index for upload dominated use case=Total upload data volume/total data transaction during execution of the use case  Equation 1

The KPI "Fair usage index" for the download dominated use case is determined using the below Equation 2.

Fair usage index for download dominated use case=Total download data volume/total data transaction during execution of the use case  Equation 2

In an embodiment, value of the KPI "Fair usage index" lies within a range of 0 to 1.

The KPI "Information availability index" is determined by computing a data criticality factor and speed factor of a socket. The data criticality factor of the socket is determined using the below Equation 3.

$$C_i = V_i/Z \quad \text{Equation 3}$$

In the above Equation 3, $C_i$ represents the data criticality factor of the $i^{th}$ socket, $V_i$ represents Volume of data flow across the socket and Z represents total data flow volume across the multiple sockets used during execution of the use case.

The speed factor of the socket is determined using the below Equation 4.

$$S_i = 1/1 + \log(1 + F_i) \quad \text{Equation 4}$$

In the above Equation 4, $S_i$ represents the speed factor of the socket and $F_i$ represents Time To First Packet (TTFP) for the $i^{th}$ socket.

Therefore, the KPI "Information availability index" is determined using the below Equation 5.

$$I = 1 - \frac{1}{n}\sum_{i=1}^{N} C_i \times S_i \quad \text{Equation 5}$$

In the above Equation 5, "I" represents the KPI "Information availability index" and "N" represents total number of sockets. Further, range of "I" lies between 0 and 1, where lower value of "I" indicates high information availability.

The KPI "Device resource consumption index" is determined using the below Equation 6.

$$R = 1 - \frac{\frac{1}{1+\log(1+D)} + \frac{1}{1+\log(1+C)}}{2} \quad \text{Equation 6}$$

In the above Equation 6, "R" represents the KPI "device resource consumption index", "D" represents measure of total data consumption of the device for the execution of the use case device and "C" represents average current consumption of the device during the use case execution. Further, range of "R" lies between 0 and 1, where lower value of "R" indicates low resource consumption.

The KIT "Network load Index" is determined using the below Equation 7, $$N = \left(\frac{1}{1+\log\left(1+\frac{T_i}{T_d+T_f}\right)}\right) \times \left(\frac{1}{1+\log\left(1+\frac{T_f}{T_d}\right)}\right) \times \qquad \text{Equation 7}$$

$$\left(\frac{1}{1+\log\left(1+\frac{1}{T}\right)}\right) \times \left(\frac{1}{1+\log\left(1+\frac{1}{S}\right)}\right)$$

In the above Equation 7, "N" represents the KPI "Network load index", "$T_i$" represents percentage of time for which the radio data channel is being kept idle, "$T_d$" represents percentage of time for which the radio data channel is in Dedicated Channel (DCH) mode, "$T_f$" represents percentage of time for which the radio data channel is in Forward Access Channel (FACH) mode, "T" represents Total use case execution time and "S" is the number of sockets created to different target Internet Protocols (IPs). Further, range of "N" lies between 0 and 1, where lower value of "N" indicates less network load.

In an embodiment, the determining module 237 determines the one or more absolute KPIs by correlating the application data 105 of the application obtained from each of the one or more mobile stations 103 separately using, but not limited to, the above Equations 1, 2, 3, 4, 5, 6 and 7. Each of the one or more absolute KPIs for the application is determined with respect to the mobile station on which the application is installed and time at which the application is used. In an embodiment, the time at which the application is used is utilized for checking network conditions when the application is used. Further, the determining module 237 determines an absolute rating of the application with respect to each of the one or more mobile stations 103 by correlating the one or more absolute KPIs of the application separately. The absolute rating of the application is determined using the below Equation 8.

$$AR_A = \frac{1}{3}\sum_{j=1}^{3} K_A^j \times W_j \text{ where} \qquad \text{Equation 8}$$

$$K_A^j \in \{K_A^i, K_A^n, K_A^r\} \text{ and } W_j \in \{W_i, W_n, W_r\}$$

In the above Equation 8, $AR_A$ represents absolute rating of the application A, $K_A^j$ represents absolute KPI value, wherein $K_A^i$ represents "Information availability index", $K_A^n$ represents absolute KPI value of "Network load index" and $K_A^r$ represents absolute KPI value of "device resource consumption index" respectively. Further, $W_j$ represents absolute weightage factor, wherein $W_i$ represents absolute weightage factor of the KPI "Information availability index" $W_n$ represents absolute weightage factor of the KPI "Network load index" and $W_r$ represents absolute weightage factor of the KPI "device resource consumption index" respectively. The above Equation 8 may also be represented as $$AR_A = \frac{1}{3}(K_A^i \times W_i + K_A^n \times W_n + K_A^r + W_r) \qquad \text{Equation 8.1}$$

In another embodiment, the determining module 237 determines average rating of the application.

The determining module 237 determines the average rating of the application by correlating the absolute rating of the application determined across each of the one or more mobile stations 103. The determining module 237 determines the average rating of the application by using the below Equation 9.

$$AvR_A = \frac{1}{N_D}\sum_{D=1}^{N_D} AR_A \qquad \text{Equation 9}$$

In the above Equation 9, $AvR_A$ represents average rating of die application and $N_D$ represents number of mobile stations.

As an example, consider an application A installed in the mobile stations D1, D2 and D3. Consider $AR_{A,D1}$ is absolute rating of the application A with respect to the mobile station D1, $AR_{A,D2}$ is absolute rating of the application A with respect to the mobile station D2 and $AR_{A,D3}$ absolute rating of the application A with respect to the mobile station D3. Therefore, according to Equation 9, average rating of the application A across all the mobile stations D1, B2 and D3 is given by the average of the absolute rating of the application A across ail the mobile stations D1, D2 and D3 i.e.

$$AvR_A 9 = (AR_{A,D1} + AR_{A,D2} + AR_{A,D3})/3$$

Similarly, the determining module 237 determines one or more absolute KPIs and absolute ratings of each of the one or more other similar applications. As an example, consider a taxi booking application "OLA", then one or more other similar applications for the taxi booking application "OLA" may be "UBER" application, "MERU" application, "TAXI FOR SURE" application etc. Further, the determining module 237 determines average rating of the one or more other similar applications by correlating absolute rating of the one or more other similar applications determined across each of the one or more mobile stations 103.

Further, the determining module 237 determines the relative rating of the application by determining one or more relative KPIs. The determining module 237 determines each of the one or more relative KPIs of the application by correlating each of the corresponding one or more absolute KPIs of the application across each of the one or more mobile stations 103. As an example, consider applications "A" and "B" which are installed on three different mobile stations "D1", "D2" and "133". Consider, the determining module 237 determines the absolute KPI value $K_{A,D,T}^j$ for the applications "A" and "B" across each of the three mobile stations "D1", "D2" and "D3" at time "T" which are represented by $K_1^j$, $K_2^j$, $K_3^j$, $K_4^j$, $K_5^j$ and $K_6^j$ respectively. The determining module 237 then determines a best class value among the one or more absolute KPI values of the application and the one or snore using the below Equation 10.

$$K_T^{j,b} = \text{Min } \{K_{A,D,T}^j\}, \text{ where } A \in \{N_A\} \text{ and } D \in \{N_D\} \qquad \text{Equation 10}$$

In the above Equation 10, $K_T^{j,b}$ represents best in class value among the one or more absolute KPIs, $N_A$ represents number of applications and $N_D$ represents number of devices i.e. number of mobile stations. According to the above Equation 10, the best in class value among the one or more absolute KPI values of the applications "A" and "B" is minimum value among the one or more absolute KPI values of the applications "A" and "B".

Therefore, for the applications "A" and "B", the best in class value among the one or more absolute KPI values with respect to the Equation 10 is $$K_T^{j,b} = \text{Min } \{K_1^j, K_2^j, K_3^j, K_4^j, K_5^j, K_6^j\}$$

Further, the determining module 237 determines relative KPI for applications "A" and "B" across each mobile station at time T using the below Equation 11, $$K_{A,D,T}^{j,r} = 1 - \frac{K_{A,D,T}^{j} - K_T^{j,b}}{K_T^{j,b}} \qquad \text{Equation 11}$$

In the above Equation 11, $K_{A,D,T}^{j,r}$ represents relative KPI of applications "A" and "B". Therefore, as an example, for the application "A", the relative KPI value of "Information availability index" with respect to the Equation 11 in D1 is given by $$K_{A,D1,T}^{i,r} = 1 - \frac{K_{A,D1,T}^{i} - K_T^{i,b}}{K_T^{i,b}}$$

in D2 is given by $$K_{A,D2,T}^{i,r} = 1 - \frac{K_{A,D2,T}^{i} - K_T^{i,b}}{K_T^{i,b}}$$

And in D3 is given by $$K_{A,D3,T}^{i,r} = 1 - \frac{K_{A,D3,T}^{i} - K_T^{i,b}}{K_T^{i,b}}$$

Similarly, the relative KPI value of "network load index" and "device resource consumption index" with respect to the Equation 11 is determined for devices D1, D2 and D3. Further, the determining module 237 determines relative KPI value across each of the one or more mobile stations 103 using the below Equation 12.

$$K_{A,T}^{j,r} = \frac{1}{N_D} \sum_{D=1}^{N_D} K_{A,D,T}^{j,r} \qquad \text{Equation 12}$$

In the above Equation 12, relative KPI value across each of the one or more mobile stations 103 is the average of the relative KPI value determined for each mobile station. Therefore, as an example, the relative KPI value of "Information availability index" across D1, D2 and D3 for the application "A" is $$K_{A,T}^{i,r} = \frac{1}{3} \sum_{D=1}^{3} K_{A,D,T}^{i,r}$$

Similarly, the determining module 237 determines relative KPI value of "network load index" and relative KPI value of "device resource consumption index" of the application across each of the one or more mobile stations 1113 using, but not limited to, the Equation 10, Equation 11 and Equation 12.

In an embodiment, the relative KPI values may be determined at different network conditions i.e. the use case execution may be performed at any given point in a day. Therefore, the determining module 237 may determine average of the time at which the relative KIT values are determined.

Upon determining the relative KPI value of "Information availability index", the relative KPI value of "network load index" and the relative KPI value of "device resource consumption index" of the application "A" across each of the one or more mobile stations 103 and at different network conditions, the determining module 237 finally determines relative rating of the application "A" using the below Equation 13.

$$RR_A = \frac{1}{3} \sum_{j=1}^{3} K_{A,T}^{j,r} \times W_j \qquad \text{Equation 13}$$

In the above Equation 13, $RR_A$ represents relative rating of the application and $W_j$ represents first weightage factor of the corresponding relative KPIs i.e. $W_i$ represents the first weightage factor of the relative KPI "Information availability index", $W_n$ represents the first weightage factor of the relative KPI "network load index" and $W_r$ represents the first weightage factor of the relative KPI "device resource consumption index". In an embodiment, the first weightage factor of the corresponding relative KPIs is assigned by one or more end users. As an example, the one or more end users may include, but not limited to, network operator and application developer.

Similarly, the determining module 237 determines each of one or more relative KPI values of one or more other similar applications across each of the one or more mobile stations 103 by correlating one or more corresponding absolute KPI values of each of the one or more other similar applications. Upon determining each of the one or more relative KPI values of the one or more other similar applications across each of the one or more mobile stations 103, the determining module 237 determines relative rating of the one or more other similar applications based on each of the one or more relative KPI values of the one or more other similar applications and a second weightage factor associated with each of the one or more relative KPIs. In an embodiment, the second weightage factor of the corresponding relative KPIs is assigned by the one or more end users.

In an embodiment, the KPI value of "Fair usage index" is not used for determining relative rating of the application directly, but may be used for drawing certain inferences based on performance of the application.

In an embodiment, the verifying module 239 verifies the performance of the application and the relative performance of the application with the one or more other similar applications. The verifying module 239 verifies performance of the application based on the absolute rating of the application and the performance of the application depends on information related to an operator network through which the application is used, geographic location where the application is used, make and model of each of the one or more mobile stations 103 on which the application is installed, design of the application and network conditions when the application is used. The verifying module 239 compares the absolute rating of the application with a predefined absolute rating standard of the application. In an embodiment, the predefined absolute rating standard of the application is a standard value which is set by the operator for every application that belongs to a same industry segment. If the absolute rating of the application is equal to or greater than the predefined absolute rating standard of the application, then the performance of the application is considered to be good. If the absolute rating of the application is less than the predefined absolute rating standard of the application, then the performance of the application is considered to be bad.

Further, the verifying module 239 verifies relative performance of the application corresponding to the one or more other similar applications by comparing the average rating of the application with the average rating of the one or more other similar applications. The relative performance of the application depends on information related to the operator network through which the application and the one or more other similar applications are used, geographic location where the application and the one or more other similar applications are used, make and model of each of the one or more mobile stations 103 on which the application and the one or more other similar applications are installed, design of the application and the one or more other similar applications and network conditions when the application and the one or more other similar applications are used.

Furthermore, the verifying module 239 verifies relative performance between the application and the one or more other similar applications by comparing each of the one or more corresponding relative KPIs of the application with each of the one or more corresponding relative KPIs of the one or more other similar applications. In an embodiment, the verifying module 239 may compare the relative rating of the application with the relative rating of the one or more other similar applications. The comparison helps us in identifying which among the application and the one or more other similar applications is more optimized.

In an embodiment, the representation module 241 provides the performance of the application and relative performance of the application In one or more representation forms to each of the one or more mobile stations 103. As an example, the one or more representation forms may include, but not limited to, text, graph, color and images.

In an embodiment, the suggestion module 243 provides one or more suggestions to each of the one or more mobile stations 103 based on the absolute rating, average rating and the relative rating of the application being used, the geographic location where the application is used and the network conditions when the application is used. As an example, the one or more suggestions may include indicating most optimized application that can be used for a particular geographic location and a particular network condition.

In an embodiment, the remedy module 245 provides one or more remedies to the one or more end users to improve the performance of the application based on the average rating and the relative rating of the application. The remedy module 245 draws one or more inferences based on the application data 105, the KPI "Fair usage index", the average rating and the relative rating of the application. As an example, the one or more inferences may be, continuous transmission of small chunk data which implies higher network load and higher device resource consumption, higher value of round trip time which leads to delay in information availability etc. Further, the one or more remedies may be to re-engineer the application for a better user experience.

Scenario

Consider two applications for booking taxis. One of the applications is "OLA" and the other application is "MERU". Consider three mobile stations/devices of the brands "Asus", "Samsung" and "Sony" comprising Android operating system. Consider that one single time of a day is selected for assessment by the assessment scheduler device 101. Since there are three mobile stations 103, total possible combinations of the Applications, the mobile stations and the time i.e. {A, D, T} are 6. The 6 possible combinations are {Asus-OLA, Samsung-OLA, Sony-OLA, Asus-MERU, Samsung-MERU, Sony-MERU}. Therefore, the application data 105 of the applications "OLA" and "MERU" in the 6 possible combinations is received from the 6 mobile stations. Absolute KPI "Information availability index" (indicated by "I") is calculated for each application using application data 105 received from each mobile station using the Equation 3, Equation 4 and Equation 5. Similarly, Absolute KPI "device resource consumption index" (indicated by "R") is calculated for each application using application data 105 received from each mobile station using the Equation 6. Similarly, Absolute KPI "network load index" (indicated by N) is calculated for each application using application data 105 received from each mobile station using the Equation 7.

Therefore, 6 KPI "I" values received for both the applications from all the 6 mobile stations are $\{K_1^j, K_2^j, K_3^j, K_4^j, K_5^j, K_6^j\}$. Similarly, 6 KPI "N" values received for both the applications from all the three mobile stations are $\{K_1^n, K_2^n, K_3^n, K_4^n, K_5^n, K_6^n\}$. Similarly, the 6 KPI "R" values received for both the applications from all the three mobile stations are $\{K_1^r, K_2^r, K_3^r, K_4^r, K_5^r, K_6^r\}$. Upon determining the absolute KPIs for both the applications across all the 6 mobile stations, a best in class value among each of the one or more absolute KPIs is determined. As an example, consider the absolute KPI values of "I" of both the applications "OLA" and "MERU" using the Equation 10 i.e. in this scenario, $$K_T^{i,b} = \text{Min}\{K_{A,D,T}^i\}, \text{ where } A \in \{OLA, MEHU\} \text{ and}$$

$$D \in \{ASUS, SAMSUNG, SONY\}$$

Therefore, for both the applications "OLA" and "MERU", the best in class value among the one or more absolute KPI values of "I" with respect to the Equation 10 is minimum KPI "I" value among the one or more absolute KPIs values of "I" of both the applications "OLA" and "MERU" which is given by $$K_T^{i,b} = \text{Min}\{K_1^i, K_2^i, K_3^i, K_4^i, K_5^i, K_6^i\}$$

Further, the relative KPI value of "I" across each of the 6 mobile stations is determined using the Equation 11.

Furthermore, the relative KPI value of "I" across all the 6 mobile stations is determined using the Equation 12. Therefore, the relative KPI value of "I" across all the 6 mobile stations in this scenario for the application "OLA" is given by:

$$K_{OLA,T}^{i,r} = \frac{1}{3}(K_{ASUS-OLA,T}^{i,r} + K_{SAMSUNG-OLA,T}^{i,r} + K_{SONY-OLA,T}^{i,r})$$

The relative KPI value of "I" across all the 6 mobile stations is the average of the relative KPI value of "I" determined for each mobile station.

Similarly, the relative KPI value of "N" $K_{OLA,T}^{n,r}$ and relative KPI value of "R" $K_{OLA,T}^{r,r}$ of the application is determined across all the three mobile stations.

Upon determining the relative KPI value of "I", the relative KPI value of "N" and the relative KPI "R" of the application across ah the mobile stations, relative rating of the application "OLA" is determined using the Equation 13 as shown below.

$$RR_{OLA} = \frac{1}{3}(K_{OLA}^{i,r} \times W_i + K_{OLA}^{n,r} \times W_n + K_{OLA}^{r,r} \times W_r)$$

$RR_{OLA}$ represents relative rating of the application "OLA" and W represents first weightage factor of the corresponding relative KPIs i.e. $W_i$ represents the first weightage factor of the relative KPI "I" $W_n$ represents the first weightage factor of the relative KPI "N" and $W_r$ represents the first weightage factor of the relative KPI "R". In an embodiment, the first weightage factor of the corresponding relative KPIs is assigned by the one or more end users.

Similarly, the relative KPIs and relative rating of the application "MERU" is determined across all the three mobile stations. Finally, the relative performance between the application "OLA" and the application "MERU" is verified by comparing each of the one or more corresponding relative KPIs of the application "OLA" with each of the one or more corresponding relative KPIs of the application "MERU".

The one or more relative KPIs of the application "OLA" are compared with the one or more relative KPIs of the application "MERU" to verify the relative performance of both the applications. Further, the relative rating of the application "OLA" and the relative rating of the application "MERU" are compared to provide one or more suggestions such as indicating most optimized application among "OLA" and "MERU" for a particular geographic location and a particular network condition.

Figure 3:
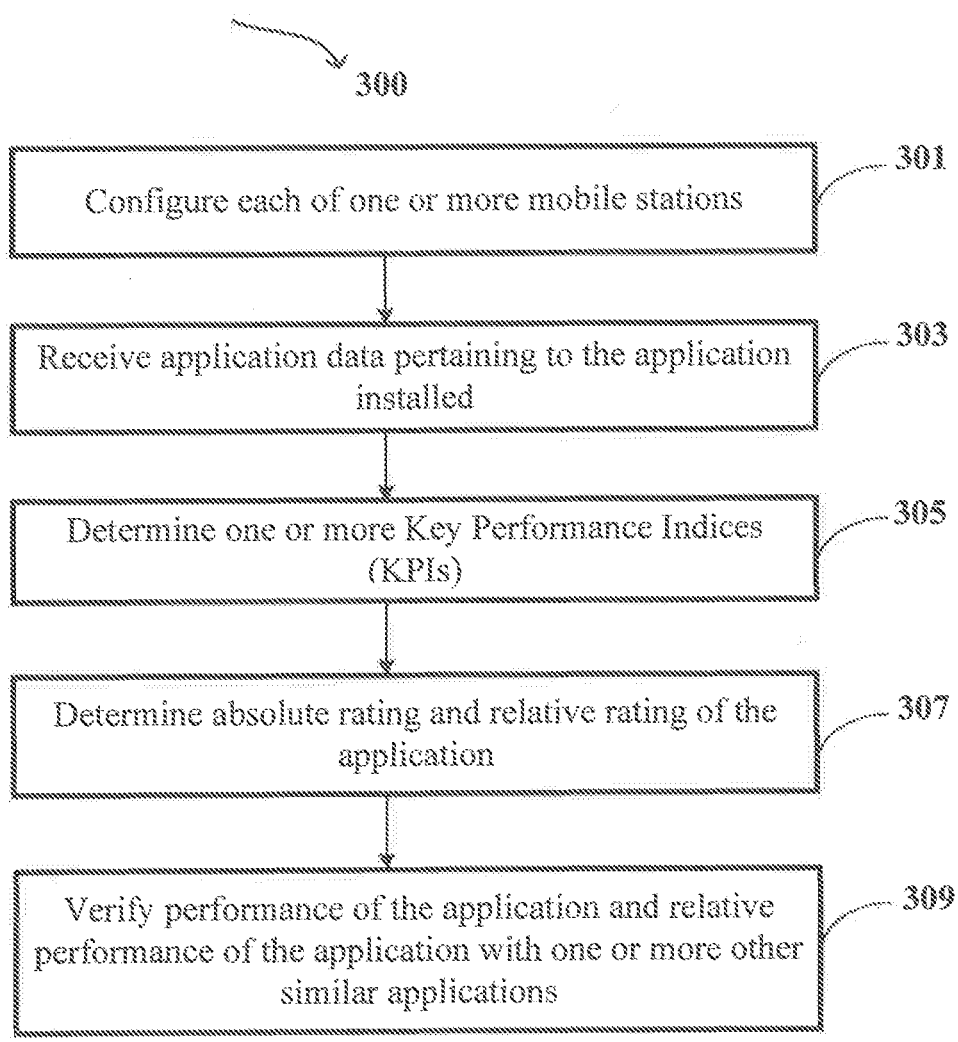
FIG. 3 shows a flowchart illustrating a method for determining performance of an application installed on one or more mobile stations in accordance with some embodiments of the present disclosure.

FIG. 3 shows a flowchart illustrating method for determining performance of an application installed on one or more mobile stations in accordance with some embodiments of the present disclosure.

As illustrated in FIG. 3, the method 300 comprises one or more blocks illustrating a method for determining performance of an application installed on one or more mobile stations 103. The method 300 may be described in the general context of computer executable instructions. Generally, computer executable instructions can include routines, programs, objects, components, data structures, procedures, modules, and functions, which perform particular functions or implement particular abstract data types.

The order in which die method 300 is described is not intended to be construed as a limitation, and any number of the described method blocks cart be combined in any order to implement the method. Additionally, individual blocks may be deleted from the methods without departing from the spirit, and scope of the subject matter described herein.

Furthermore, the method can be implemented in any suitable hardware, software, firmware, or combination thereof.

At block 301, each of the one or more mobile stations 103 is configured. In an embodiment, a processor 109 of the application performance detection system 107 receives a performance assessment request 102 from an assessment scheduler device 101. Upon receiving the performance assessment request 102, the processor 109 configures each of the one or more mobile stations 103 by executing one or more scripts. As an example, the one or more scripts may include, but not limited to, configuration scripts and execution scripts. The processor 109 configures each of the one or more mobile stations 103 to deactivate any hardware and software modules present In each of the one or more mobile stations 103 that do not contribute for application data IDS to ensure that the hardware and software modules do not cause additional network traffic and resource utilization. The processor 109 ensures that there is no pre-existing open socket so that no traffic flows through the one or more mobile stations 103 when the use case is being executed. Finally, the processor 109 activates a monitoring module in each of the one or more mobile stations 103 to monitor and collect the application data 10S.

At block 303, the application data 105 pertaining to the application is received. In an embodiment, the application data 105 is received from each of the one or more mobile stations 103 that are configured. The application data 105 comprises one or more device parameters and network traffic parameters.

At block 305, one or more absolute Key Performance Indices (KPIs) are determined. In an embodiment, the one or more KPIs are determined by correlating the application data 105 received from each of the one or more mobile stations 103 separately. As an example, the one or more KPIs may include, but not limited to, the fair usage index, the information availability index, the network load index and the device resource consumption index. Fair usage index is a measure of volume of business data consumed by the application. Information availability index is a measure of how fast the data is made available to/from the network. Network load index is a measure of amount of network load generated by the execution of the use ease. Device resource consumption index is a measure of device current and device data consumption during the use case execution.

At block 307, absolute rating of the application is determined. In an embodiment, the absolute rating of the application is determined by correlating the one or more absolute KPIs of the application obtained from each of the one or more mobile stations 103 separately. Further, the processor 109 determines average rating of the application. The processor 109 correlates the absolute rating of the application determined for each mobile station to determine the average rating of the application. Similarly, the processor 109 determines one or more absolute KPIs and absolute ratings of each of the one or more other similar applications. Further, average rating of the one or more other similar applications is determined by correlating absolute rating of the one or more other similar applications determined for each mobile station.

Furthermore, the processor 109 determines each of one or more relative KPIs of the application by correlating each of the corresponding one or more absolute KPIs of the application and each of the corresponding one or more absolute KPIs of the one or more other similar applications across each of the one or more mobile stations 103. Similarly, each of one or more relative KPIs of one or more other similar applications across each of the one or more mobile stations 103 is determined by the processor 109. Further, relative rating of the application based on each of the one or more relative KPIs of the application and a first weightage factor associated with each of the one or more relative KPIs is determined by the processor 109. Also, the processor 109 determines relative rating of the one or more other similar applications based on each of the one or more relative KPIs of the one or more other similar applications and a second weightage factor associated with each of the one or more relative KPIs.

At block 309, performance of the application and relative performance of the application with the one or more other similar applications is verified. In an embodiment, the processor 109 verifies performance of the application by comparing the absolute rating of the application with a predefined absolute rating standard of die application. In an embodiment, the processor 109 verifies relative performance between the application and the one or more other similar applications by comparing the average rating of the application with the average rating of the one or more other similar applications. In another embodiment, the processor 109 verifies relative performance between the application and the one or more other similar applications by comparing each of the one or more corresponding relative KPIs of the application with each of the one or more corresponding relative KPIs of the one or more other similar applications. In an embodiment, the processor 109 may compare the relative rating of the application with the relative rating of the one or more other similar applications. The comparison helps us in identifying which among the application and the one or more other similar applications is more optimized.

Figure 4:
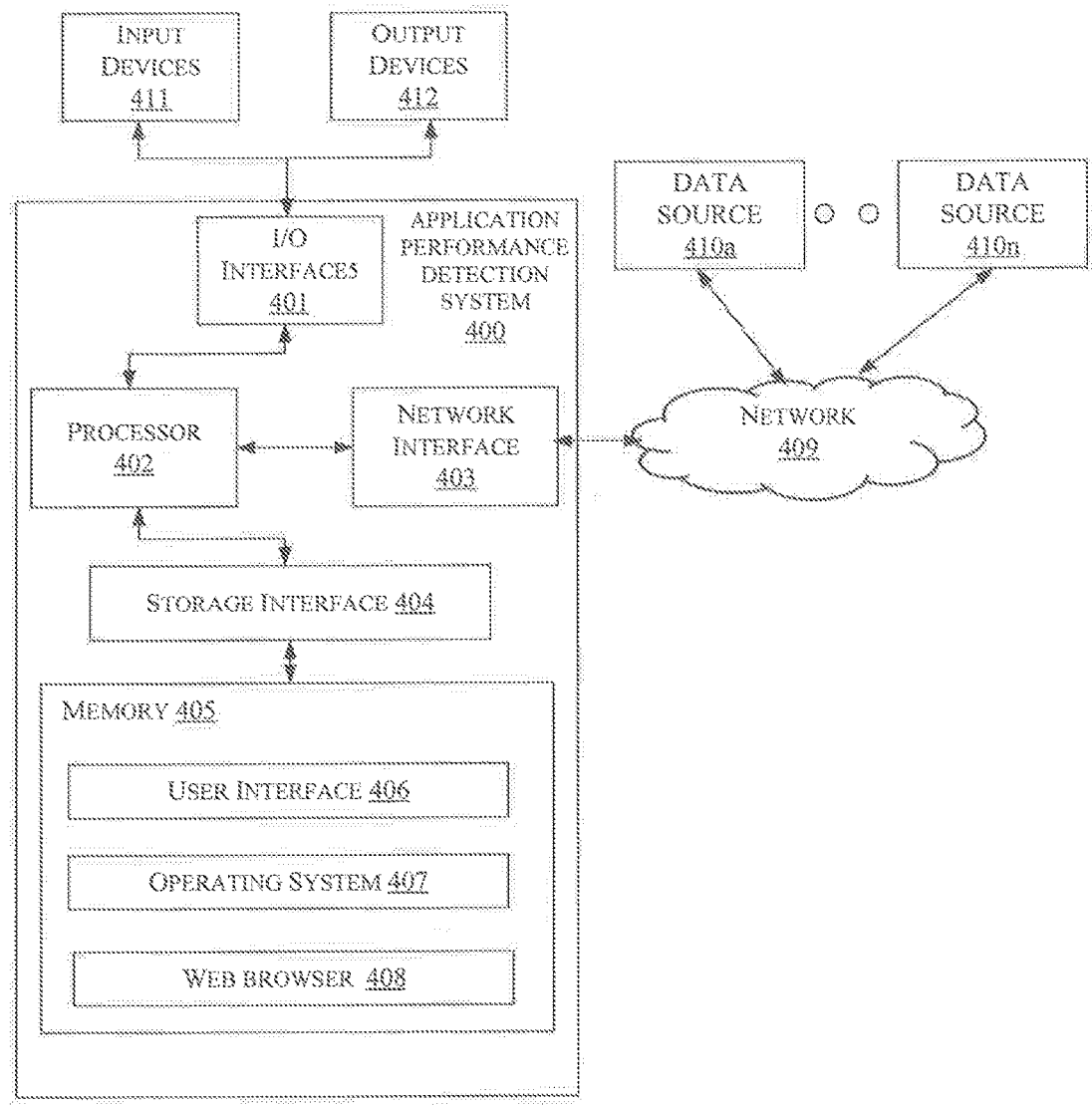
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, the application performance detection system 400 is used for determining performance of an application installed on one or more mobile stations. The application performance detection system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus. Universal Serial Bus (USB), infrared, PS/2, BSC, coaxial, component, composite, Digital Visual Interface (DVI), high-definition, multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the application performance detection system 400 may communicate with one or more I/O devices (411 and 412).

In some embodiments, the processor 402 may be disposed in communication with a communication network 409 via a network interface 403. The network interface 403 may communicate with the communication network 409. The one or more data sources 410 (a . . . n) communicate with the application performance detection system 400 through wireless communication network. The one or more data sources 411) (a, . . . , a) may include, but not limited to, one or more mobile stations.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel. Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web browser 408 etc. In some embodiments, application performance detection system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the application performance detection system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the application performance detection system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc,), Unix X-Windows, web interface libraries (e.g., ActiveX, Java, Javascript, AJAX, HTML, Adobe Flash, etc.), or the like.

In some embodiments, the application performance detection system 400 may implement a web browser 408 stored program component. The web browser may be a hypertext viewing application, such as Microsoft Internet Explorer, Google Chrome, Mozilla Firefox, Apple Safari, etc. Secnre web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the application performance detection system 400 may implement a mail server stored program component. The mail server may be an Internet mail server such as Microsoft Exchange, or the like, The mail server may utilize facilities such as Active Server Pages (ASP), ActiveX, American National Standards Institute (ANSI) C++/C#, Microsoft .NET, CGI scripts, lava, JavaScript, PERL, PHP, Python, WebObjects. etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the application performance detection system 400 may implement a mail client stored program component. The mail client may be a snail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store Instructions for execution by one or more processors, including instructions for causing the processors) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure provides a method for determining performance of an application installed on one or more mobile stations.

The present disclosure provides a feature wherein average rating and relative rating is determined for applications in an operator network that detects low rated application design that requires re-engineering.

The present disclosure provides a feature wherein an optimized application can be suggested to one or more users based on their geographic location.

The present disclosure achieves significant reduction in operational data costs, improved device battery life, improved user experience and efficient network resource usage by using the most optimized applications and also by re-engineering the low rated application design, A description of an embodiment with several components in communication with each other does not imply that ail such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for determining performance of an application installed on one or more mobile stations. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have beets selected to delineate or circumscribe the inventive subject matter, it is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
| --- | --- |
| 100 | Architecture |
| 101 | Assessment scheduler device |
| 101a | Administrator |
| 102 | Performance assessment request |
| 103 | One or more mobile stations |
| 104 | Historical database |
| 105 | Application data |
| 107 | Application performance detection system |
| 109 | Processor |
| 111 | I/O interface |
| 113 | Memory |
| 203 | Data |
| 205 | Modules |
| 206 | Configuration data |
| 207 | Key performance index data |
| 221 | Other data |
| 231 | Receiving module |
| 233 | Mobile Station configuration module |
| 237 | Determining module |
| 239 | Verifying module |
| 241 | Representation module |
| 243 | Suggestion module |
| 245 | Remedy module |
| 247 | Other modules |

We claim:

1. A method for determining performance of an application installed on one or more mobile stations, the method comprising:

configuring, by an application performance detection system, each of the one or more mobile stations upon receiving a performance assessment request from an assessment scheduler device associated with the application performance detection system;

receiving, by the application performance detection system, application data pertaining to the application from each of the one or more mobile stations 103 thus configured, wherein the application data comprises one or more device parameters and network traffic parameters;

determining, by the application performance detection system, one or more absolute Key Performance Indices (KPIs) of the application based on the application data of the application obtained from each of the one or more mobile stations, wherein the one or more KPIs comprises at least one of fair usage index, information availability index, network load index and device resource consumption index;

determining, by the application performance detection system, absolute rating of the application based on a correlation of the one or more absolute KPIs of the application obtained from each of the one or more mobile stations separately; and verifying, by the application performance detection system, the performance of the application based on a comparison of the absolute rating of the application with a predefined absolute rating standard of the application.

2. The method as claimed in claim 1, wherein configuring each of the one or more mobile stations comprises:

deactivating, by the application performance detection system, hardware and software modules present in each of the one or more mobile stations that do not provide the application data; and activating, by the application performance detection system, a monitoring module in each of the one or more mobile stations for monitoring and collecting the application data, wherein the application data to be monitored and collected depends on current data processing in each of the one or more mobile stations;

wherein the data processing is initiated by the application performance detection system.

3. The method as claimed in claim 1, wherein the performance of the application depends on information related to an operator network through which the application is used, geographic location where the application is used, make and model of each of the one or more mobile stations on which the application is installed, design of the application and network conditions when the application is used.

4. The method as claimed in claim 1 further comprising:

determining, by the application performance detection system, average rating of the application base on the absolute rating of the application corresponding to each of the one or more mobile stations;

determining, by the application performance detection system, average rating of one or more other similar applications by correlating absolute rating of the one or more other similar applications corresponding to each of the one or more mobile stations, wherein the absolute rating of the one or snore other similar applications is obtained by performing one or more steps of claim 1; and verifying, by the application performance detection system, relative performance of the application corresponding to the one or more other similar applications by comparing the average rating of the application with the average rating of the one or more other similar applications.

5. The method as claimed in claim 1 further comprising:

determining, by the application performance detection system, each of one or more relative KPIs of the application and one or more other similar applications by correlating each of the corresponding one or more absolute KPIs of the application with corresponding one or more absolute KPIs of the one or more other similar applications across each of the one or more mobile stations, wherein the one or more absolute KPIs of each of the one or more other similar applications is obtained by performing one or more steps of claim 1;

determining, by the application performance detection system, relative rating of the application based on each of the one or more relative KPIs of the application and a first weightage factor associated with each of the one or more relative KPIs, wherein the first weightage factor is assigned by one or more end users;

determining, by the application performance detection system, relative rating of the one or more other similar applications based on each of the one or more relative KPIs of the one or more other similar applications and a second weightage factor associated with each of the one or more relative KPIs, wherein the second weightage factor is assigned by one or more end users;

verifying, by the application performance detection system, relative performance between the application and the one or more other similar applications by comparing each of the one or more corresponding relative KPIs of the application with each of the one or more corresponding relative KPIs of the one or more other similar applications; and identifying, by the application performance detection system, optimized application among the application and the one or more other similar applications by comparing the relative rating of the application with the relative rating of the one or more other similar applications.

6. The method as claimed in claim 5 further comprising providing, by the application performance detection system, one or more suggestions to each of the one or more mobile stations based on the absolute rating, relative rating and average rating of the application being used, geographic location where the application is used and network condition when the application is used.

7. The method as claimed in claim 1 further comprising providing, by the application performance detection system, one or more remedies to one or more end-users to improve the performance of the application based on the application data 105, the one or more absolute KPIs, relative rating and average rating of the application.

8. The method as claimed in claim 1 further comprising providing, by the application performance detection system, the performance of the application in one or more representation forms to each of the one or more mobile stations.

9. An application performance detection system for determining performance of an application installed on one or more mobile stations, the application performance detection system comprising:

a processor; and a memory communicatively coupled to the processor, wherein the memory stores the processor-executable instructions, which, on execution, causes the processor to:

configure each of the one or more mobile stations upon receiving a performance assessment request from an assessment scheduler device associated with the application performance detection-system;

receive application data pertaining to the application from each of the one or more mobile stations thus configured, wherein the application data comprises one or more device parameters and network traffic parameters;

determine one or more absolute Key Performance Indices (KPIs) of the application based on the application data of the application obtained from each of the one or more mobile stations, wherein the one or more KPIs comprises at least one of fair usage index, information availability index, network load index and device resource consumption index;

determine absolute rating of the application based on a correlation of the one or more absolute KPIs of the application obtained from each of the one or more mobile stations separately; and verify the performance of the application based on a comparison of the absolute rating of the application with a predefined absolute rating standard of the application.

10. The application performance detection system as claimed in claim 9, wherein to configure each of the one or more mobile stations, the instructions cause the processor to:

deactivate hardware and software modules present in each of the one or more mobile stations 103 that do not provide the application data; and activate a monitoring module in each of the one or more mobile stations for monitoring and collecting the application data, wherein the application data to be monitored and collected depends on current data processing in each of the one or more mobile stations;

wherein the data processing is initiated by the application performance detection system.

11. The application performance detection system as claimed in claim 9, wherein the performance of the application depends on information related to an operator network through which the application is used, geographic location where the application is used, make and model of each of the one or more mobile stations on which the application is installed, design of the application and network conditions when the application is used.

12. The application performance detection system as claimed in claim 9, further causes the processor to:

determine average rating of the application based on the absolute rating of the application corresponding to each of the one or more mobile stations;

determine average rating of one or more other similar applications by correlating absolute rating of the one or more other similar applications corresponding to each of the one or more mobile stations, wherein the absolute rating of the one or more other similar applications is obtained by performing one or more steps of claim 1; and verify relative performance of the application corresponding to the one or more other similar applications by comparing the average rating of the application with the average rating of the one or more other similar applications.

13. The application performance detection system as claimed in claim 9, further causes the processor to:

determine each of one or more relative KPIs of the application and one or more other similar applications by correlating each of the corresponding one or more absolute KPIs of the application with corresponding one or more absolute KPIs of the one or more other similar applications across each of the one or more mobile stations, wherein the one or more absolute KPIs of each of the one or more other similar applications is obtained by performing one or more steps of claim 1;

determine rating of the application based on each of the one or more relative KPIs of the application and a first weightage factor associated with each of the one or more relative KPIs, wherein the first weightage factor is assigned by one or more end users;

determine relative rating of the one or more other similar applications based on each of the one or more relative KPIs of the one or more other similar applications and a second weightage factor associated with each of the one or more relative KPIs, wherein the second weightage factor is assigned by one or more end users;

verify relative performance between the application and the one or more other similar applications by comparing each of the one or more corresponding relative KPIs of the application with each of the one or more corresponding relative KPIs of the one or more other similar applications; and identify optimized application among the application and the one or more other similar applications by comparing the relative rating of the application with the relative rating of the one or more other similar applications.

14. The application performance detection system as claimed in claim 13, further causes the processor to provide one or more suggestions to each of the one or more mobile stations based on the absolute rating, relative rating and average rating of the application being used, geographic location where the application is used and network condition when the application is used.

15. The application performance detection system as claimed in claim 9 further causes the processor to provide one or more remedies to one or more end-users to improve the performance of the application based on the application data, the one or more absolute KPIs, relative rating and average rating of the application.

16. The application performance detection system as claimed in claim 9 further causes the processor to provide the performance of the application in one or more representation forms to each of the one or more mobile stations.

17. A method for determining performance of an application installed on one or more mobile stations, the method comprising:

configuring, by an application performance detection system, each of the one or more mobile stations upon receiving a performance assessment request from an assessment scheduler device associated with the application performance detection system;

receiving, by the application performance detection system, application data pertaining to the application from each of the one or more mobile stationsthus configured, wherein the application data comprises one or more device parameters and network traffic parameters;

determining, by the application performance detection system, one or more absolute Key Performance Indices (KPIs) of the application based on the application dataof the application obtained from each of the one or more mobile stations, wherein the one or more KPIs comprises at least one of fair usage index, information availability index, network load index and device resource consumption index;

determining, by the application performance detection system, absolute rating of the application based on a correlation of the one or more absolute KPIs of the application obtained from each of the one or more mobile stationsseparately;

verifying, by the application performance detection system, the performance of the application based on comparison of the absolute rating of the application with a predefined absolute rating standard of the application;

determining, by the application performance detection system, average rating of the application based on the absolute rating of the application corresponding to each of the one or more mobile stations;

determining, by the application performance detection system, average rating of one or more other similar applications by correlating absolute rating of the one or more other similar applications corresponding to each of the one or more mobile stations; and verifying, by the application performance detection system, relative performance of the application corresponding to the one or more other similar applications by comparing the average rating of the application with the average rating of the one or more other similar applications.

* * * * *

UNITED STATES PATENT AND TRADEMARK OFFICE
CERTIFICATE OF CORRECTION

PATENT NO. : 9,986,407 B2
APPLICATION NO. : 15/374122
DATED : May 29, 2018
INVENTOR(S) : Debashis Mahata et al.

Page 1 of 1

It is certified that error appears in the above-identified patent and that said Letters Patent is hereby corrected as shown below:

Claim 4, Column 25, Line 44, "one or snore" should read as --one or more--.

Claim 17, Column 28, Line 54, "stationsseparately" should read as --stations separately--.

Signed and Sealed this
Eleventh Day of September, 2018

Andrei Iancu
*Director of the United States Patent and Trademark Office*